United States Patent [19]
Fischperer

[11] Patent Number: 5,569,987
[45] Date of Patent: Oct. 29, 1996

[54] POWER SUPPLY SYSTEM FOR A LONG-STATOR DRIVE FOR A MAGNETIC LEVITATION TRAIN

[75] Inventor: Rolf Fischperer, Erlangen, Germany

[73] Assignee: Siemens Aktiengesellschaft, Munich, Germany

[21] Appl. No.: 390,005

[22] Filed: Feb. 17, 1995

[30] Foreign Application Priority Data

Mar. 4, 1994 [DE] Germany .................. 44 07 240.6

[51] Int. Cl.⁶ ...................... H02K 41/00; B61B 13/12
[52] U.S. Cl. .................. 318/135; 104/282; 246/28 R; 246/167 M
[58] Field of Search ........................ 104/282, 284, 104/293; 310/12; 318/135, 111; 246/2 F, 28 R, 34 R, 167 M

[56] References Cited

U.S. PATENT DOCUMENTS

| | | | |
|---|---|---|---|
| 3,768,417 | 10/1973 | Thornton et al. | 318/135 |
| 3,792,665 | 2/1974 | Nelson | 318/135 |
| 3,895,585 | 7/1975 | Schwärzler | 318/135 |
| 3,914,670 | 10/1975 | Holtz | 318/135 |
| 3,991,958 | 11/1976 | Sibley et al. | 246/34 R |
| 4,603,640 | 8/1986 | Miller et al. | 104/282 |
| 5,053,654 | 10/1991 | Augsburger et al. | 310/12 |
| 5,473,993 | 12/1995 | Kalsi | 318/135 |

FOREIGN PATENT DOCUMENTS

| | | |
|---|---|---|
| 3909706 | 2/1991 | Germany . |
| 4130779 | 3/1993 | Germany . |

OTHER PUBLICATIONS

Etz. vol. 108 (1987) No. 9, pp. 378–381; Jürgen Meins; *Energieversorgung des Langstatorantriebs*.
ETR vol. 38 (1989), No. 3, Mar. 1989, pp. 175–176, Hestra–Verlag, Darmstadt, DE.

*Primary Examiner*—John W. Cabeca
*Attorney, Agent, or Firm*—Kenyon & Kenyon

[57] ABSTRACT

A power supply system for a long-stator drive, whose stator winding along a path for a magnetic levitation train is subdivided into several controllable stator segments. The stator segments are controllable via at least one segment switch on at least one section cable system running along the stator segments. At least one frequency transformer is provided per section cable system, with the frequency transformer(s) arranged in at least one substation along the stator segments. Each frequency transformer generates a supply voltage system for the stator segments, with the nominal voltage in the section cable system being greater than the nominal voltage of the stator segments. At least one matching transformer is connected between the section cable systems and the stator segments, through which the nominal voltage of the section cable system can be transformed down to the nominal voltage of the stator segments.

5 Claims, 4 Drawing Sheets

5,569,987

POWER SUPPLY SYSTEM FOR A LONG-STATOR DRIVE FOR A MAGNETIC LEVITATION TRAIN

BACKGROUND OF THE INVENTION

1. Field of the Invention

The present invention concerns a power supply system for a long-stator drive for a magnetic levitation train.

Power supply systems for magnetic levitation trains are known that comprise a long-stator drive whose stator winding is subdivided into a plurality of controllable stator segments along a path of a magnetic levitation train. The stator segments can be connected through at least one segment switch along a section cable system running along the stator segments. Each section cable system provides at least one frequency transformer, with at least one frequency transformer arranged in at least one substation along the stator segments. The frequency transformer generates an appropriate supply voltage system for the stator segments. A power supply system with these features is known, for example, from German Patent 39 17 058 C1.

In the known embodiment, each section cable system is supplied by two frequency converters (double-supply). This arrangement reduces the current load on the section cable by one-half and creates redundancies suitable for emergency operation in the case of total failure of a frequency converter or the transformer substation. Under this configuration, the distance between transformer substations corresponds to the distance between consecutive trains.

In the substation itself, the high voltage of a power utility line is transformed into medium voltage and switched to the section cable system via a frequency converter with an output transformer, and finally to the stator segments. The frequency converter generates a system of variable frequencies and variable amplitudes.

Another power supply system is disclosed in German Patent 39 09 706 C2. This system also comprises a long-stator drive subdivided into a plurality of controllable stator segments along the path of a magnetic levitation train. The stator segments can be connected through at least one segment switch along the section cable system running along the stator segments. One or more frequency transformers generate a supply voltage system for the stator segments. In this power supply system, a supply voltage system is generated, via a single frequency transformer with an output transformer (this latter referred to as transformer in German Patent 39 09 706 C2). The supply voltage system is switched to the section cable system and ultimately to the stator segments.

Connecting two neighboring section cable systems together via a coupling switch is known from the paper "Long-stator Drive Power Supply" in the journal "etz," Vol. 108 (1987), 9, pp. 378 through 391, FIG. 5.

The paper "New Transrapid Drive Concept" in the journal "Eisenbahntechnische Rundschau ETR" (1989), Vol. 3, pp. 175 and 176, describes the bypassing of output transformers in the low-speed range (direct supply).

German Patent Application 41 30 779 A1 discloses the parallel connection of frequency transformers.

SUMMARY OF THE INVENTION

The object of the present invention is to provide a power supply system for a long-stator drive that uses a simpler and less expensive section cabling compared to the previously known power supply systems.

The power supply system of the present invention is a high-voltage power supply. The higher voltage with a lower current flow (compared to a medium-voltage power supply) results in a lower voltage drop and power loss than in a medium-voltage power supply. The number of section cables in parallel and/or the size of the individual section cables can be reduced due to the lower current flow.

Furthermore, in the power supply system of the present invention, the required electric power can be transported over larger distances. Thus, longer distances between transformer substations are possible so that fewer substations must be installed for a given drive section length.

In this power supply system, a double power supply may optionally be omitted. When the double power supply is omitted, the problem of uneven load distribution ceases to exist. The invention with the solution provided by the invention, a lower substation capacity has to be installed for either single or double power supply due to the higher efficiency and lower apparent power requirement of the section cables.

In certain embodiments, two or more of the neighboring section cable systems can be connected through a coupling switch. With this arrangement, when the substation normally supplying the section fails, the section cable system affected is supplied by the substation of the neighboring section cable system.

Another embodiment allows the section cable systems of two long-stator drives to be switched in parallel and the corresponding stator segments to be switched in series. This advantageously results in a current addition according to the number of section cable systems connected in parallel. In another embodiment, it is advantageously ensured that, in the case of frequency transformer failure, the unaffected frequency transformers at least partially cover the power needs of the stator segments of the affected long-stator drive.

DETAILED DESCRIPTION

The three-phase systems described by FIGS. 1 through 4 are represented as single-phase systems.

Figure 1:
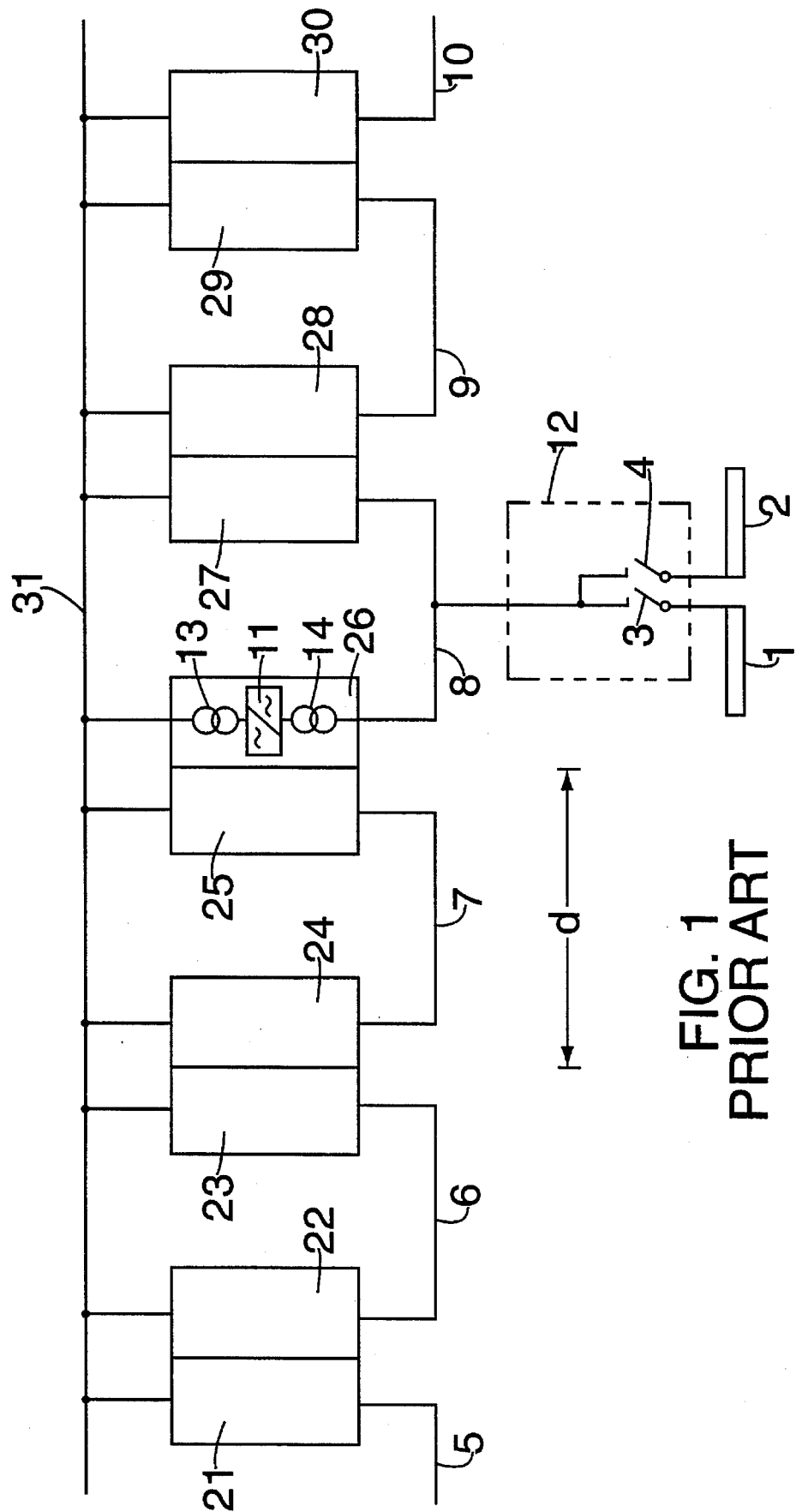
FIG. 1 shows a power supply system according to the prior art.
Figure 2:
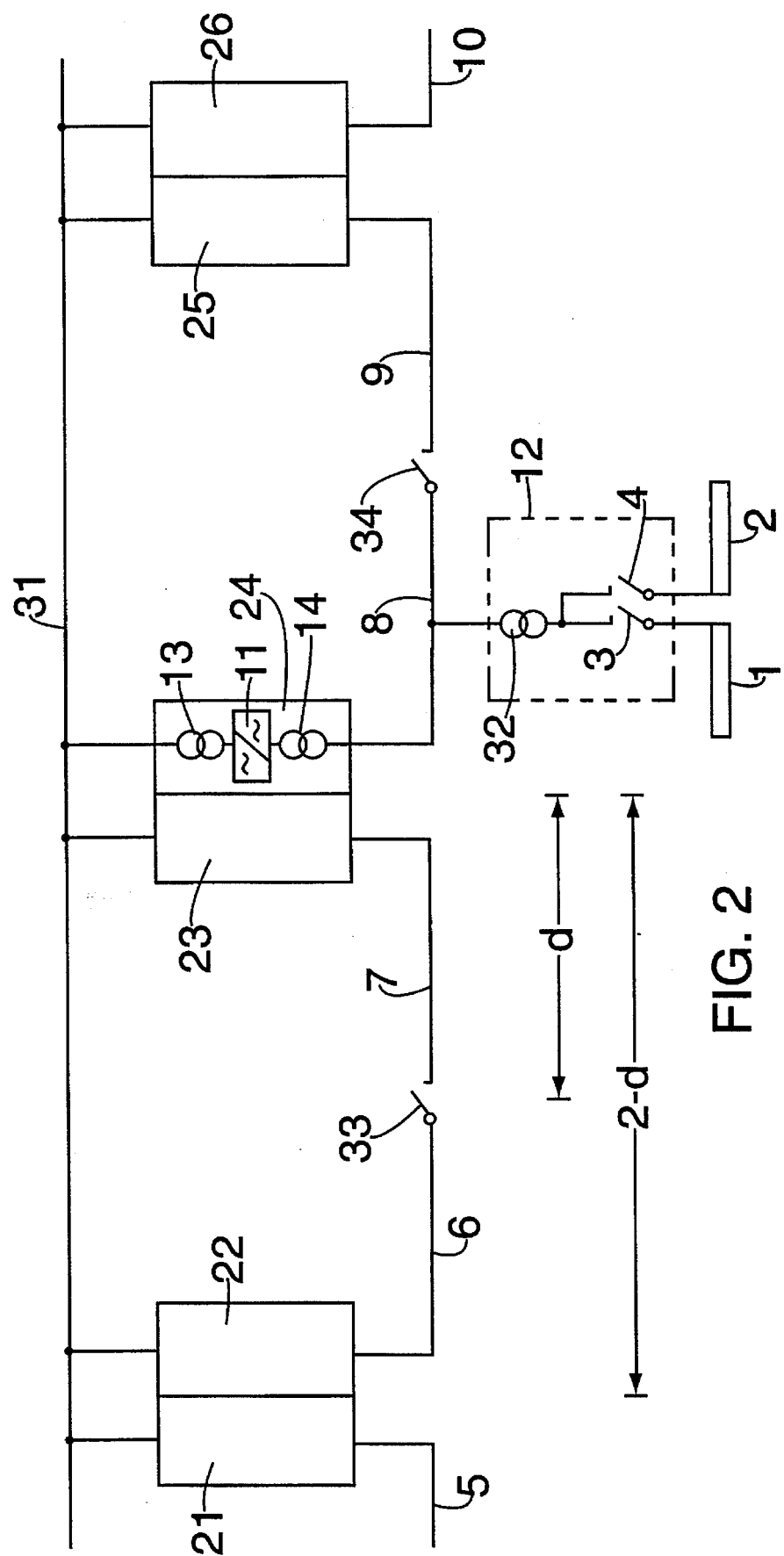
FIG. 2 shows a first embodiment of the power supply system according to the invention.

In FIGS. 1 and 2, the stator winding of a long-stator drive is subdivided into a plurality of stator segments 1, 2 along a path for a magnetic levitation train. Of the stator segments having the same length in the illustrated embodiment, only stator segments 1 and 2 are shown. Stator segments 1 and 2 can be switched to section cable system 8 running along the stator segments via section switches 3 and 4, respectively, located in a switching station 12.

Likewise, further stator segments, not illustrated, can be switched to section cable systems 5 through 7, 9, and 10. In the prior art represented by FIG. 1, two frequency transformers (of which only one frequency transformer 11 is represented in FIG. 1) are provided for each section cable system 5 through 10. Each frequency transformer is assigned to a substation 21 through 30 along the stator segment. Thus, in the power supply system illustrated in FIG. 1, two neighboring substations supply the same section cable system, referred to as double supply (e.g., substations 26 and 27 both supply section cable system 8). This has the effect of making the distance between substations correspond to the distance between consecutive trains, d.

In substations 21 through 30 the high voltage of the utility line 31 (e.g., 110 kV, 50 Hz) is transformed to medium voltage and switched to stator cable systems 5 through 10 and finally to stator segments 1, 2 via the frequency transformers (only one frequency transformer 11 is illustrated in FIG. 1) with the output transformers. Each frequency transformer in substations 21 through 30 generates a supply voltage system, i.e., a variable-frequency, variable-amplitude system. This supply voltage system is normally referred to as a medium-voltage supply system.

In the power supply system according to the present invention, as shown in FIG. 2, each section cable system 5 through 10 is supplied by one frequency transformer only (i.e., single-supply). For example, section cable system 8 is supplied only by frequency transformer 11. This has the effect of making the distance between substations correspond to twice the distance between consecutive trains, 2d. Each frequency transformer (only one frequency transformer 11 is illustrated in FIG. 2) is assigned to a substation 21 through 26 and also generates a supply voltage system, i.e., a variable-frequency and variable-amplitude system. The supply voltage system of the power supply system according to the invention is henceforward referred to as a high-voltage supply system, since the supply voltage is higher compared to the above-described prior art.

For this purpose, in the power supply system of the invention, the high voltage of utility line 31 is first transformed into medium-voltage in each substation 21 through 26 by voltage transformer 13. Then, frequency transformer 11 generates a variable-frequency and variable-amplitude system, which is then transformed into high voltage again by voltage transformer 14.

The nominal voltage in section cable systems 5 through 10 is greater than the nominal voltage of stator segments 1 and 2, which must be designed as medium-voltage systems due to the switching means (vacuum contacts) utilized and the synchronous internal voltage. Therefore a matching transformer 32 is connected between section cable systems 5 through 10 and stator segments 1, 2, by which the nominal voltage of the section cable systems 5 through 10 can be transformed down to the nominal voltage of stator segments 1 and 2.

In the embodiment shown in FIG. 2, two neighboring section cable systems 6, 7, and 8, 9 can be connected together via a coupling switches 33 and 34, respectively. Thus, in the case of failure of one of the substations, the section cable system affected is supplied from the substation of the neighboring section cable system.

Figure 3:
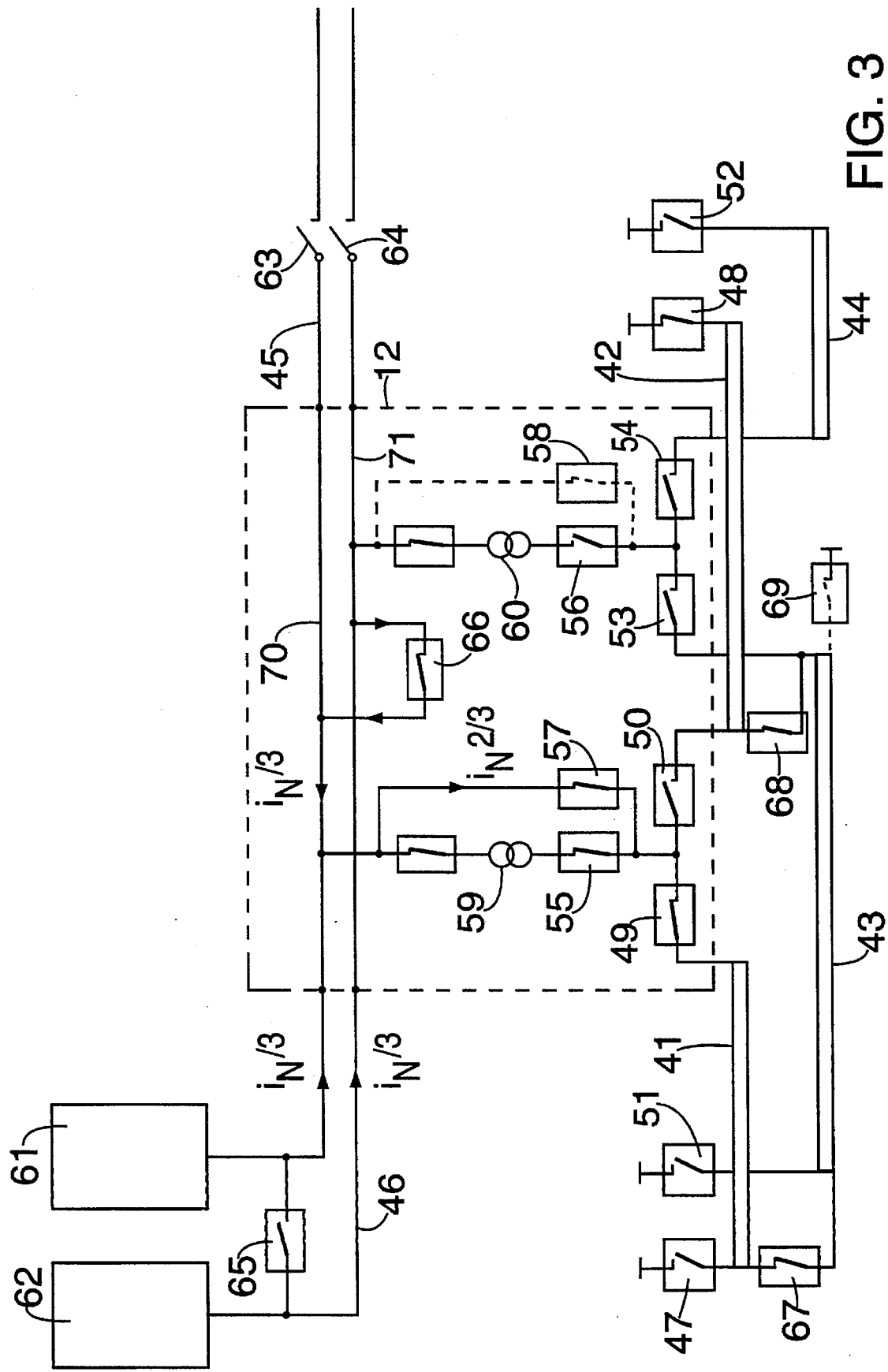
FIG. 3 shows a second embodiment of the power supply system according to the invention in startup operation.
Figure 4:
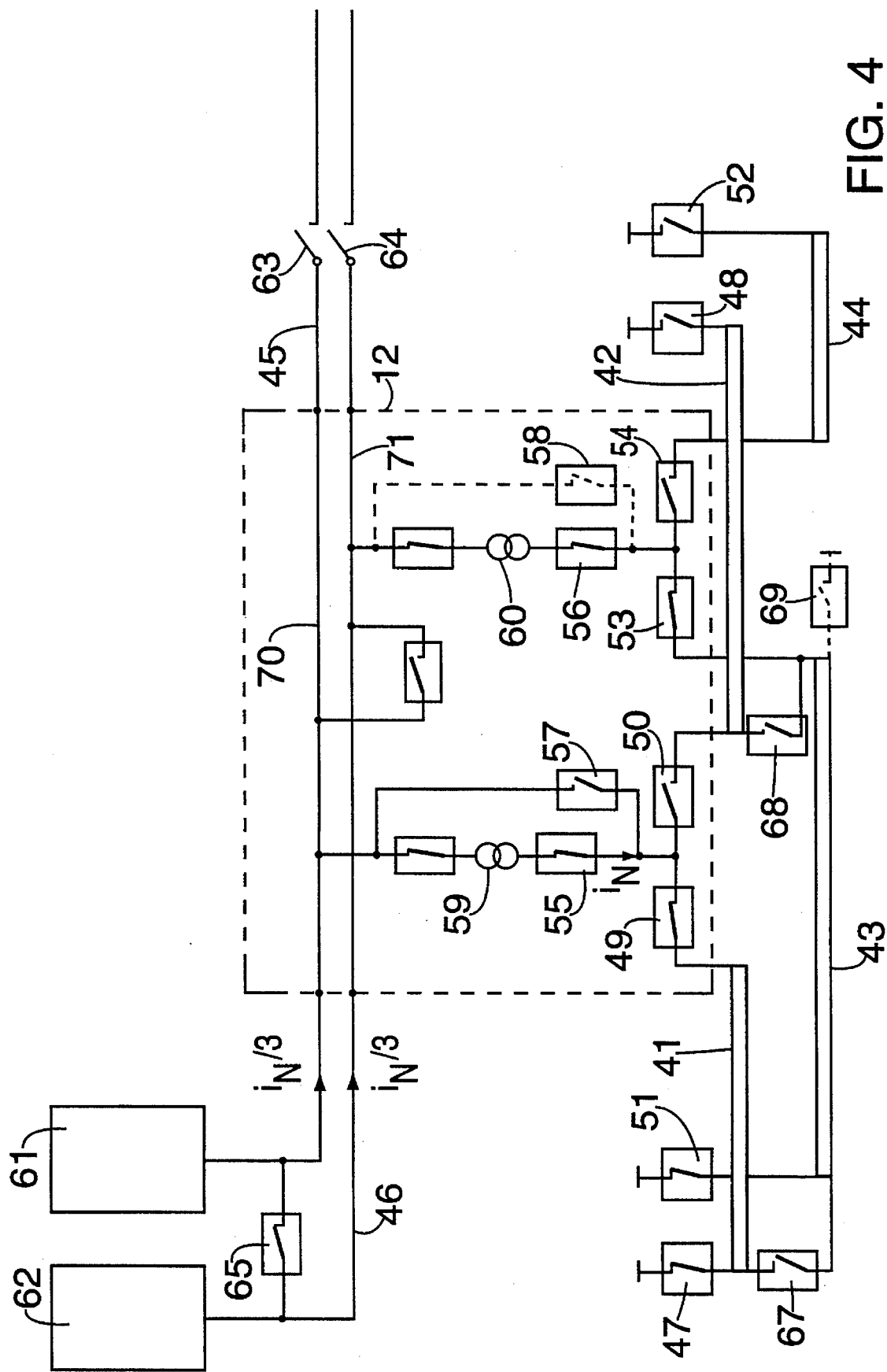
FIG. 4 shows the power supply system of FIG. 3 in regular operation.

In FIGS. 3 and 4 two long-stator drives are connected in parallel for driving a single magnetic levitation train. The stator winding of each long-stator drive is subdivided into a plurality of controllable stator segments 41 through 44 along the path of the magnetic levitation train. Stator segments 41 and 42 can be switched to conductor rail 70, and stator segments 43 and 44 can be switched to conductor rail 71. Conductor rails 70 and 71 are electrically conductively connected to section cable systems 45 and 46, respectively. Stator segments 41 and 42 are connected at one end to neutral point switches 47 and 48, respectively, and at the other end to supply switches 49 and 50, respectively.

Likewise, stator segments 43 and 44 are connected to neutral point switches 51 and 52, respectively, and to supply switches 53 and 54, respectively. Each of the neutral point switches 47 and 48, as well as 51 and 52, forms a neutral point in the closed position. Supply switches 49 and 50 can be switched to conducting rail 70 via a segment switch 55, while supply switches 53 and 54 can be switched to conducting rail 71 via a segment switch 56.

Matching transformers 59 and 60 for transforming down the nominal voltage of section cable systems 45 and 46 to the nominal voltage of stator segments 41 through 44 are connected in series with segment switches 55 and 56, respectively. Thus, in this embodiment, a common matching transformer 59 and 60 is provided for each pair of stator segments 41, 42, and 43, 44, respectively.

Section cable systems 45 and 46 are supplied by frequency transformers 61 and 62, respectively, with a variable-frequency and variable-amplitude supply voltage. In the event of a malfunction, an affected section cable system can be switched to the neighboring section cable system, not shown in FIGS. 3 and 4, via coupling switches 63 and 64, respectively.

Furthermore, two parallel connection switches 65 and 66 are provided. Parallel connection switch 65 is connected, at one end, to section cable system 45 and, at the other end, to section cable system 46. Parallel connection switch 46 is connected at one end to conducting rail 70 and, at the other end, to conducting rail 71.

Stator segments 41 and 43 are connected together through their neutral point ends via a cross-connection switch 67. In addition, stator segments 42 and 43 are connected together via their input side ends by means of a cross-connection switch 68. In lieu of the latter connection, stator segment 43 can be connected to another neutral point switch 69 with its input side end.

In order to start the magnetic levitation train, segment switches 55 and 56 are opened and bypass switch 57 is closed, thus bypassing matching transformer 59. Bypass switch 58 remains open. Section cable systems 45 and 46 are connected in parallel by closing parallel connection switch 66 (and, if necessary, parallel connection switch 65). At the same time, neutral point switch 48, supply switch 49 and cross-connection switches 67 and 68 are closed. Where a neutral point switch 69 is used as an alternative to cross-connection switch 68, the neutral point switch must be closed. All other switches are open. Stator segments 41 through 43 are thus connected in series.

By connecting section cable systems 45 and 46 in parallel and stator segments 41 through 44 in series, nominal currents $i_N$ are added in the section cable systems. For a nominal voltage of 30 kV in each of section cable systems 45 and 46 and a nominal voltage of 10 kV in each of stator segments 41, 42 and 43 and 44, according to the transforming ratio from high voltage to medium voltage, a nominal current of $i_N/3$ flows in both section cable systems. Through the switching positions described above, two-thirds of the nominal current $i_N$ is available for startup operation (FIG. 3). During startup, overload operation in relation to the section cables is also possible, so that the full nominal current $i_N$ is available.

In order to go from stamp operation (FIG. 3) to regular operation (FIG. 4), bypass switch 57, parallel connection switches 65 and 66, as well as cross-connection switches 67 and 68 (or cross-connection switch 67 and neutral point switch 69) must be opened. In addition, supply switch 53 and segment switches 55 and 56 must be closed.

Conducting rails 70 and 71 are advantageously arranged together with the section-side switching components in a common switching station 12.

What is claimed is:

1. A power supply system for a long-stator drive for a magnetic levitation train, comprising:
   a) a long-stator drive subdivided into a plurality of controllable stator segments along the path of the magnetic levitation train, each stator segment electrically connected to at least one section cable system running along the stator segments;
   b) at least one segment switch along said section cable system wherein each stator segment can be connected to at least one other stator segment through a segment switch;
   c) at least one frequency transformer provided for each section cable system and arranged in at least one substation along said stator segments, wherein said frequency transformer generates a supply voltage for said stator segments, and wherein the nominal voltage of said section cable system is greater than the nominal voltage of said stator segments; and
   d) at least one matching transformer connected between said section cable systems and said stator segments through which the nominal voltage of said section cable systems is transformed to the nominal voltage of said stator segments.

2. The power supply system of claim 1, wherein a predefinable number of said section cable systems have a coupling switch through which two neighboring section cable systems can be connected together.

3. The power supply system of claim 1, wherein the direct current required for starting is supplied to said stator segment by bypassing said one or more matching transformers that occur between said section cable systems and said stator segments used to start the magnetic levitation train.

4. The power supply system of claim 3, wherein the section cable systems of two long-stator drives in a section cable system that consists of at least two long-stator drives can be switched in parallel and the corresponding stator segments can be switched in series.

5. The power supply system of claim 4 wherein the one or more frequency transformers of each long-stator drive can be switched in parallel using a switching means so that the one or more frequency transformers supply a plurality of section cable systems simultaneously.

* * * * *